United States Patent
Ahn et al.

(10) Patent No.: US 10,673,131 B2
(45) Date of Patent: Jun. 2, 2020

(54) COIL ASSEMBLY (71) Applicant: WITS Co., Ltd., Yongin-si, Gyeonggi-do (KR)

(72) Inventors: Dae Ung Ahn, Suwon-si (KR); Jae Hyoung Cho, Suwon-si (KR); Dae Seong Jeon, Suwon-si (KR); Sung Uk Lee, Suwon-si (KR); Ki Won Chang, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 180 days.

(21) Appl. No.: 15/994,021

(22) Filed: May 31, 2018

(65) Prior Publication Data

US 2019/0109373 A1    Apr. 11, 2019

(30) Foreign Application Priority Data

Oct. 11, 2017   (KR) ........................ 10-2017-0129978

(51) Int. Cl.

| | |
|---|---|
| H01Q 1/38 | (2006.01) |
| H01Q 7/00 | (2006.01) |
| G06K 19/077 | (2006.01) |
| H04B 5/00 | (2006.01) |
| G06K 19/07 | (2006.01) |
| H01F 27/38 | (2006.01) |
| H01Q 1/22 | (2006.01) |
| H01F 27/00 | (2006.01) |
| H01Q 1/40 | (2006.01) |
| H01F 27/28 | (2006.01) |
| H01Q 21/28 | (2006.01) |
| H01F 38/14 | (2006.01) |
| H01F 5/00 | (2006.01) |
| H02J 7/02 | (2016.01) |
| H02J 50/10 | (2016.01) |

(52) U.S. Cl.
CPC ........... *H01Q 1/38* (2013.01); *G06K 19/0726* (2013.01); *G06K 19/07779* (2013.01); *H01F 5/00* (2013.01); *H01F 27/006* (2013.01); *H01F 27/2871* (2013.01); *H01F 27/38* (2013.01); *H01F 38/14* (2013.01); *H01Q 1/2225* (2013.01); *H01Q 1/40* (2013.01); *H01Q 7/00* (2013.01); *H01Q 21/28* (2013.01); *H04B 5/0025* (2013.01); *H02J 7/025* (2013.01); *H02J 50/10* (2016.02)

(58) Field of Classification Search
CPC .. H01Q 1/38; H01Q 1/22; H01Q 1/40; H01Q 7/00; H01Q 21/28; G06K 19/07
USPC ........................................................ 343/895
See application file for complete search history.

(56) References Cited

U.S. PATENT DOCUMENTS

2011/0215984 A1* 9/2011 Coburn .................. H01Q 1/362
343/876

FOREIGN PATENT DOCUMENTS

| KR | 10-2009-0086863 A | 8/2009 |
|---|---|---|
| KR | 10-2015-0065001 A | 6/2015 |
| KR | 10-2017-0022421 A | 3/2017 |

* cited by examiner

*Primary Examiner* — Andrea Lindgren Baltzell
(74) *Attorney, Agent, or Firm* — Harness, Dickey & Pierce, P.L.C.

(57) ABSTRACT

A coil assembly includes: a substrate; and a coil wiring coupled to the substrate and including a spiral wiring and a lead wiring, wherein the spiral wiring includes a first section forming an outer portion of the spiral wiring and a second section, disposed inside the first section, and having a line width narrower than a line width of the first section.

18 Claims, 9 Drawing Sheets

COIL ASSEMBLY

CROSS-REFERENCE TO RELATED APPLICATIONS

This application claims the benefit under 35 U.S.C. § 119(a) of Korean Patent Application No. 10-2017-0129978 filed on Oct. 11, 2017 in the Korean Intellectual Property Office, the entire disclosure of which is incorporated herein by reference for all purposes.

BACKGROUND

1. Field

The present disclosure relates to a coil assembly.

2. Description of Related Art

Recently, systems for wirelessly transmitting power in addition to performing functions such as radio frequency identification (RFID), near field communication (NFC), magnetic secure transmission (MST), in order to charge batteries of portable terminals with the power, have been added to portable terminals. In addition, such functions are generally performed by a coil, and a plurality of coils are therefore mounted in the portable terminals.

Since the plurality of coils are often mounted in a thin portable terminal, a coil structure capable of significantly decreasing a size of a coil assembly and providing high efficiency is desirable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a coil assembly includes: a substrate; and a coil wiring coupled to the substrate and including a spiral wiring and a lead wiring, wherein the spiral wiring includes a first section forming an outer portion of the spiral wiring and a second section, disposed inside the first section, and having a line width narrower than a line width of the first section.

The spiral wiring may satisfy $0.2*P1 \leq P2 < P1$, wherein P1 is a line width of a wiring part forming the first section and P2 is a line width of a wiring part forming the second section.

A number of turns of the spiral wiring disposed in the second section may be 75% or less of a total number of turns of the spiral wiring.

Spiral wiring parts constituting the first section may be disposed on opposite surfaces of the substrate, respectively, and end portions of the spiral wiring parts may be connected to each other.

Spiral wiring parts constituting the second section may be disposed on opposite surfaces of the substrate, respectively, and end portions of the spiral wiring parts may be connected to each other.

Spiral wiring parts constituting the second section may be disposed on opposite surfaces of the substrate, respectively, and may be connected to each other in series.

The lead wire may traverse the spiral wiring in a diameter direction of the spiral wiring.

The lead wire may be disposed on a first surface of the substrate, and may be connected to a wiring of the second section disposed on a second surface of the substrate through an interlayer connection conductor formed in the substrate.

The spiral wiring may include any one of a press coil formed by pressing a metal plate in a coil shape, a flat type wire, and an insulated wire.

The lead wire may be disposed outside of the second section.

The coil assembly may further include a connection substrate coupled to one surface of the substrate and having the lead wired formed thereon.

The spiral wiring may include at least one turn of a connection wiring connecting the first section and the second section to each other, and the connection wiring may have a line width gradually decreasing toward the second section.

The coil wiring may be configured to transmit and receive power for wireless charging.

The coil assembly may further include a second coil wiring and a third coil wiring disposed in a vicinity of the spiral wiring, wherein each of the second and third coil wirings are configured to perform any one of a radio frequency identification (RFID) function, a near field communications (NFC) function, and a magnetic secure transmission (MST) function.

In another general aspect, a coil assembly includes: a connection substrate including a lead wiring having a first end connected to a connection pad; and a coil wiring including a first section extending from a second end of the lead wiring, and a second section disposed inside the first section, extending spirally from the first section, and having a line width narrower than a line width of the first section.

A line width of a wiring part forming the second section may be 20% or more of a line width of a wiring part forming the first section.

A number of turns of the coil wiring disposed in the second section may be 75% or less of a total number of turns of the coil wiring disposed in the first section.

The coil assembly may further include another coil wiring disposed outside of the coil wiring, wherein the coil wiring is configured to transmit or receive power for wireless charging, and the other coil wiring is configured to operate as an antenna.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the following description, a wireless power charging device may be a power transmitting device transmitting power and a power receiving device configured to receive and store power therein.

Figure 1:
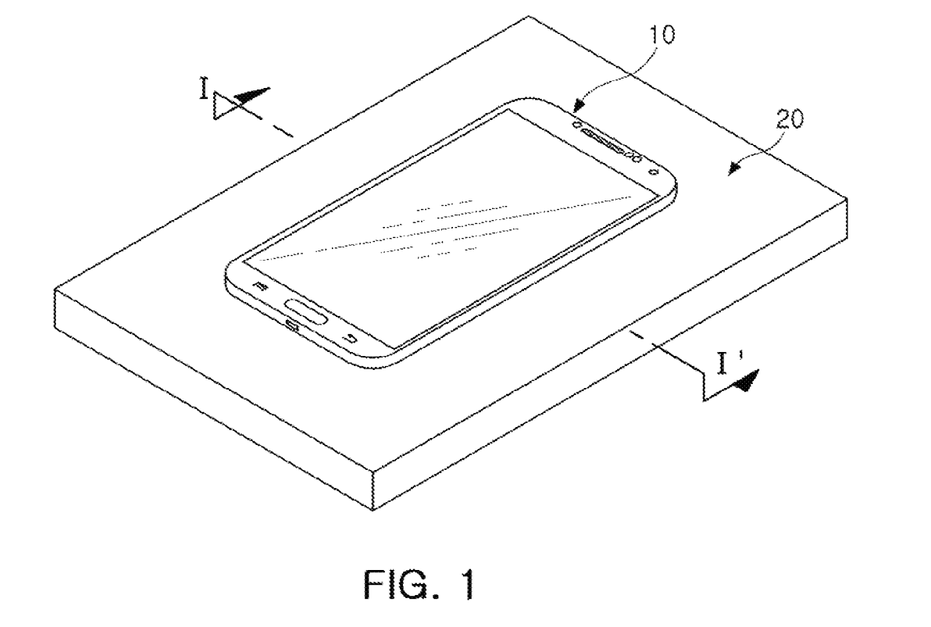
FIG. 1 is a schematic perspective view illustrating an electronic device, according to an embodiment.
Figure 2:
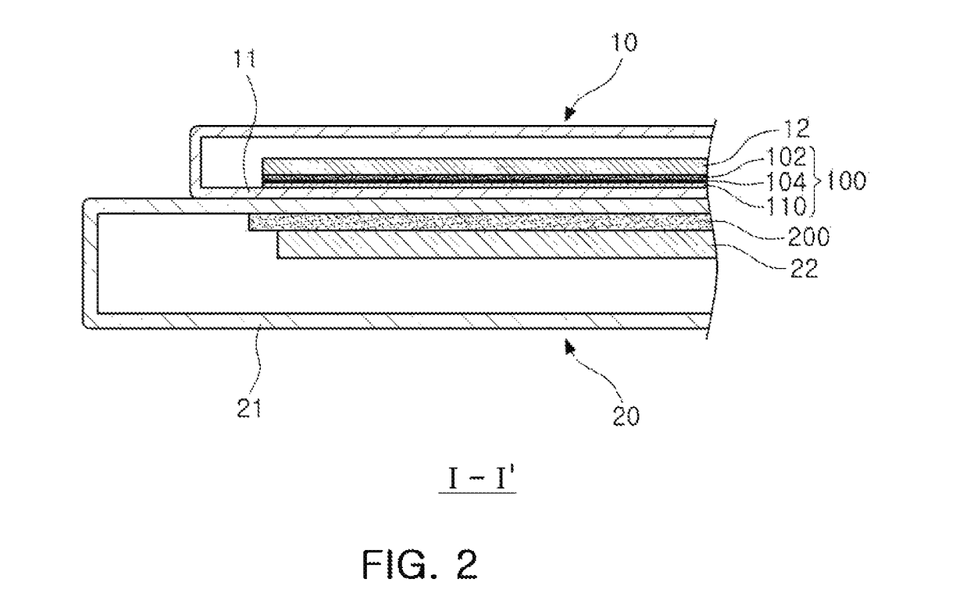
FIG. 2 is a cross-sectional view taken along line I-I' of FIG. 1.

FIG. 1 is a schematic perspective view illustrating an electronic device, according to an embodiment in. FIG. 2 is a cross-sectional view taken along line I-I' of FIG. 1.

Referring to FIGS. 1 and 2, the electronic device, which is a wireless power charging device, may be a charging device 20 configured to wirelessly transmit power or a portable terminal 10 configured to wirelessly receive and store the power therein.

The portable terminal 10 includes a battery 12 and a power receiving device 100 configured to supply power to the battery 12 to charge the battery 12 with the power.

The battery 12 may be a secondary battery that is rechargeable and may be configured to be detachable from the portable terminal 10, but is not limited thereto.

The power receiving device 100 may be accommodated in a case 11 of the portable terminal 10 and be directly attached to an inner surface of the case 11 or be disposed as adjacent to the inner surface of the case 11 as possible.

The power receiving device 100 includes a magnetic portion 102 and a coil assembly 110.

The magnetic portion 102 may have a flat plate shape (or a sheet shape), and may be disposed on one surface of the coil assembly 110 and be fixed and attached to the coil assembly 110. The magnetic portion 102 is provided in order to efficiently form a magnetic path of a magnetic field generated by a coil wiring of the coil assembly 110. To this end, the magnetic portion 102 is formed of a material in which a magnetic path may be easily formed, such as a ferrite sheet.

Although not illustrated, a metal sheet may be added between the magnetic portion 102 and the battery 12 in order to block electromagnetic waves or a leaked magnetic flux, if necessary. The metal sheet may be formed of aluminum, but is not limited thereto.

In addition, an adhesion portion 104 may be interposed between the coil assembly 110 and the magnetic portion 102 so that the coil assembly 110 and the magnetic portion 102 are firmly fixed and adhered to each other.

The adhesion portion 104 may be disposed between the coil assembly 110 and the magnetic portion 102, and may bond the magnetic portion 102 and the coil assembly 110 to each other. The adhesion portion 104 may be formed of an adhesive sheet or an adhesive tape, and may be formed by applying an adhesive or a resin having an adhesive property to a surface of the coil assembly 110 or the magnetic portion 102.

In addition, the adhesion portion 104 may contain ferrite powders, such that the adhesion portion 104 may have a magnetic property together with the magnetic portion 102.

The charging device 20 may be provided in order to charge the battery 12 of the portable terminal 10 with the power. To this end, the charging device 20 includes a voltage converting portion 22 and a power transmitting device 200 disposed in a case 21.

The voltage converting portion 22 may convert household alternating current (AC) power supplied from an external source to direct current (DC) power, then convert the DC power into an AC voltage having a specific frequency, and then supply the AC voltage having the specific frequency to the power transmitting device 200.

When the AC voltage is applied to the power transmitting device 200, a magnetic field in the vicinity of the power transmitting device 200 is changed. Therefore, a voltage may be applied to the power receiving apparatus 100 of the portable terminal 10 disposed adjacent to the power transmitting apparatus 200 depending on the change in the magnetic field. Therefore, the battery 12 may be charged with the power.

The power transmitting device 200 may be configured similarly to the power receiving device 100 described above. Therefore, a detailed description for the power transmitting device 200 is omitted.

The coil assembly 110 of the power receiving device 100 will hereinafter be described in detail.

Figure 3:
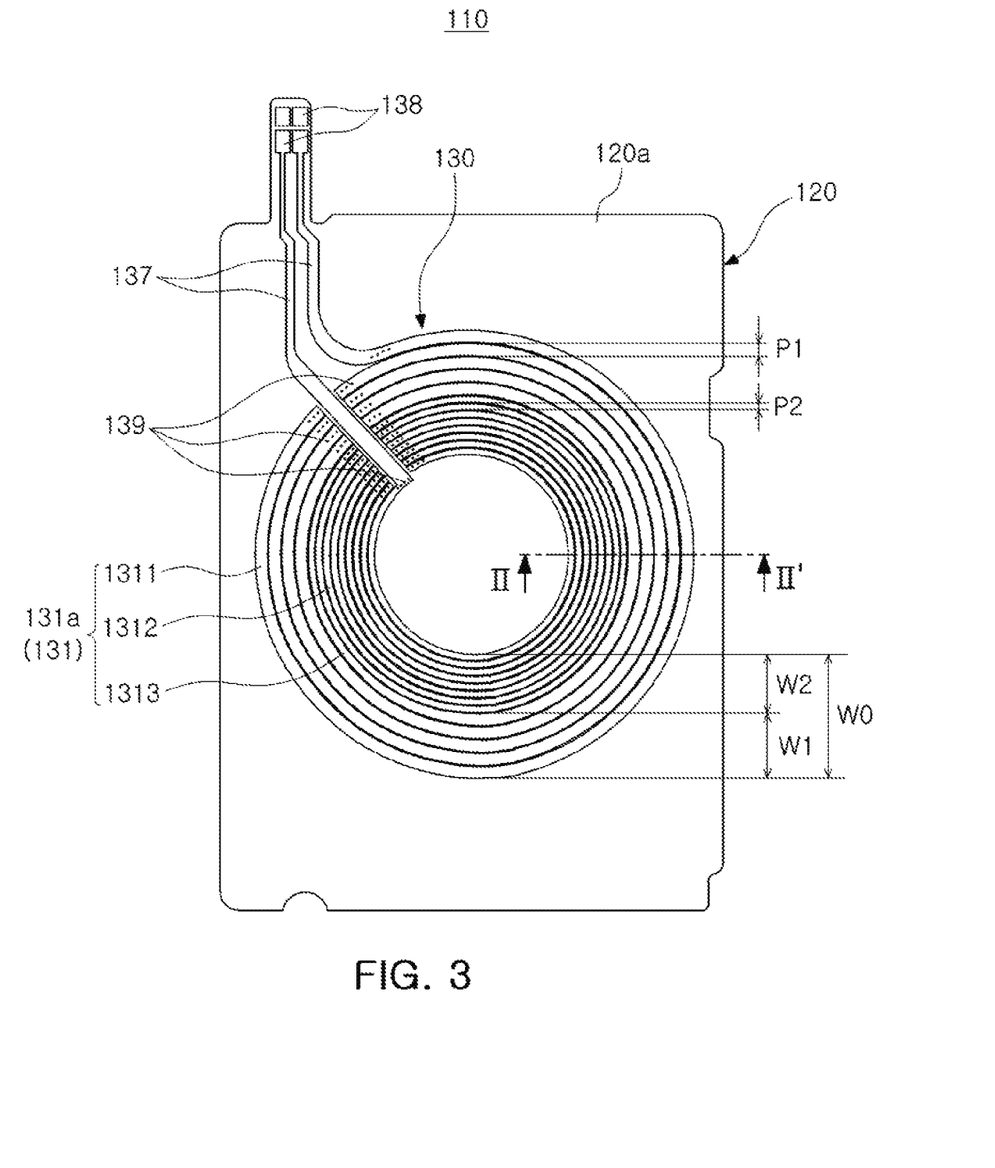
FIG. 3 is a schematic plan view illustrating a coil assembly of FIG. 2.
Figure 4:
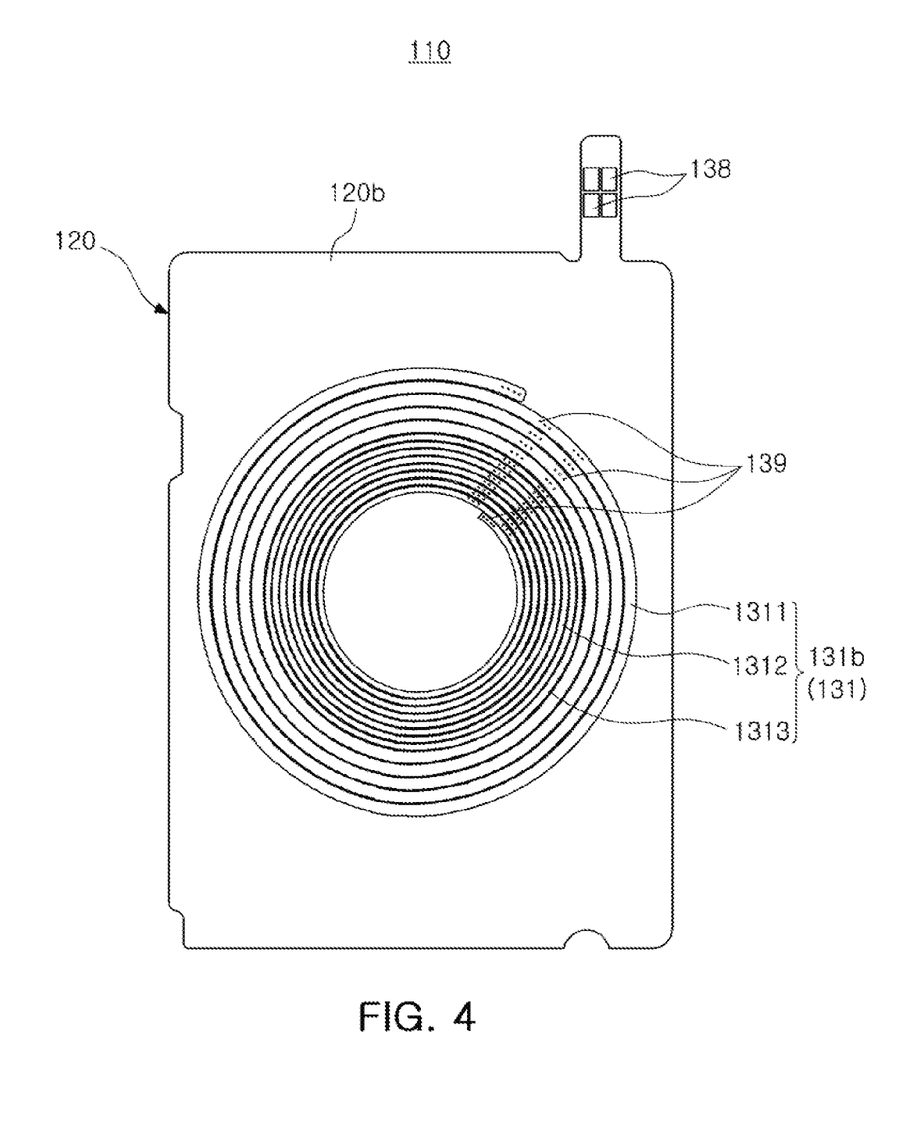
FIG. 4 is a rear view of the coil assembly illustrated in FIGS. 2 and 3.
Figure 5:
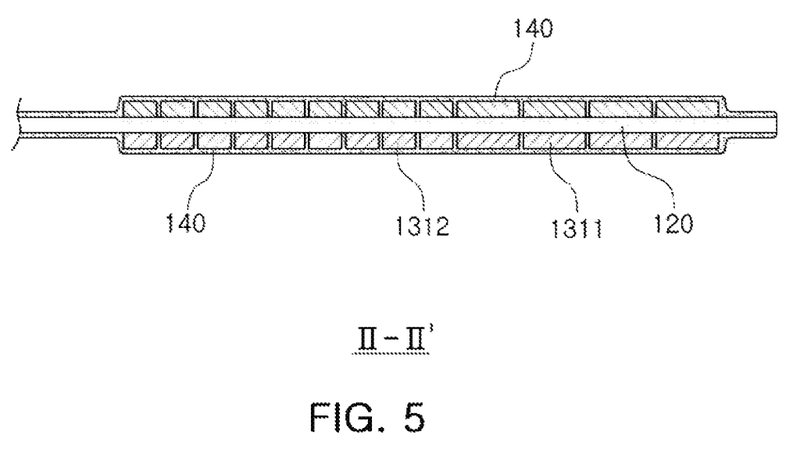
FIG. 5 is a cross-sectional view taken along line II-II' of FIG. 3.

FIG. 3 is a schematic plan view illustrating the coil assembly 110 of FIG. 2. FIG. 4 is a rear view of the coil assembly 110. FIG. 5 is a cross-sectional view taken along line II-II' of FIG. 3.

Referring to FIGS. 3 through 5, the coil assembly 110 includes a substrate 120 and a coil wiring 130 disposed on at least one surface of the substrate 120.

The substrate 120, which is an insulating substrate having circuit wirings formed on opposite surfaces thereof, may be an insulating film such as a polyimide film. However, the substrate 120 is not limited to such a polyimide film, and various materials may be used as the substrate 120 as long as they have a small thickness and the circuit wirings may be formed on opposite surfaces of them.

The coil wiring 130 may be formed using the opposite surfaces of the substrate 120, and may have some of circuit wirings formed of a copper foil, as an example, on the substrate 120.

The coil assembly 110 may be manufactured by patterning a double-sided copper clad laminate (CCL). In addition, the coil assembly 110 may be formed on opposite surfaces of a flexible insulating substrate such as a film by photolithography, and may be manufactured using, for example, a double-sided flexible printed circuit board (FPCB).

Therefore, the coil assembly 110 may be formed to have a very small thickness. However, the coil assembly 110 may also be may be manufactured using a multilayer substrate or using a PCB having rigidity, if necessary.

Referring to FIGS. 3 and 4, the coil wiring 130 may be formed of a thin metal layer, and may include spiral wirings 131a and 131b (collectively referred to as "spiral wiring 131" for convenience) forming a coil shape, lead wirings 137, and connection pads 138.

The connection pads 138 may be contact points electrically connecting the coil assembly 110 to another component.

Still referring to FIGS. 3 and 4, the spiral wirings 131a and 131b may be disposed on the opposite surfaces of the substrate 120, respectively, to face each other. That is, the spiral wiring 131a may be a first spiral wiring 131a formed on a first surface 120a of the substrate 120, and the spiral wiring 131b may be a second spiral wiring 131b formed on a second surface 120b of the substrate 120.

The first spiral wiring 131a may be partially disconnected, and the lead wirings 137 may be disposed in a disconnected region of the first spiral wiring 131a.

Therefore, the lead wirings 137 may be disposed to traverse the first spiral wiring 131a through the disconnected region in a diameter (radial) direction of the first spiral wiring 131a. The lead wirings 137 are wirings connecting one end of the first spiral wiring 131a disposed at the center (e.g., the innermost turn) of the first spiral wiring 131a and one of the connection pads 138 to each other, and connecting another end of the first spiral wiring 131 disposed at an outer portion (e.g., the outermost turn) and another one of the connection pads 138 to each other.

In addition, as shown in FIGS. 3 and 4, the first spiral wiring 131a and the second spiral wiring 131b are electrically connected to each other through interlayer connection conductors 139. The interlayer connection conductors 139 may be disposed at a position adjacent to the disconnected region. Therefore, the first spiral wiring 131a and the second spiral wiring 131b may be disposed in parallel with each other on the opposite surfaces of the substrate 120, respectively. In addition, the first spiral wiring 131a may be electrically connected through the interlayer connection conductors 139 and the second spiral wiring 131b in the disconnected region in which the lead wirings 137 are disposed.

As illustrated in FIG. 5, an insulating protecting layer 140 may be formed on the coil wiring 130. The insulating protecting layer 140 may protect the coil wiring 130 from external impact, and may be provided to provide insulation from an external component. The connection pads 138 may be in contact with the external component, and may be electrically connected to the external component. Therefore, the insulating protecting layer 140 may be partially removed on the connection pads 138, and at least portions of the connection pads 138 may thus be externally exposed.

In addition, as shown in FIGS. 3 to 5, the coil wiring 130 includes a first section 1311 constituting outer portions of the spiral wirings 131a and 131b and a second section 1312 constituting inner portions of the spiral wirings 131a and 131b. The first section 1311 and the second section 1312 may have different widths. In detail, the first section 1311 may have a width greater than that of the second section 1312.

Figure 6:
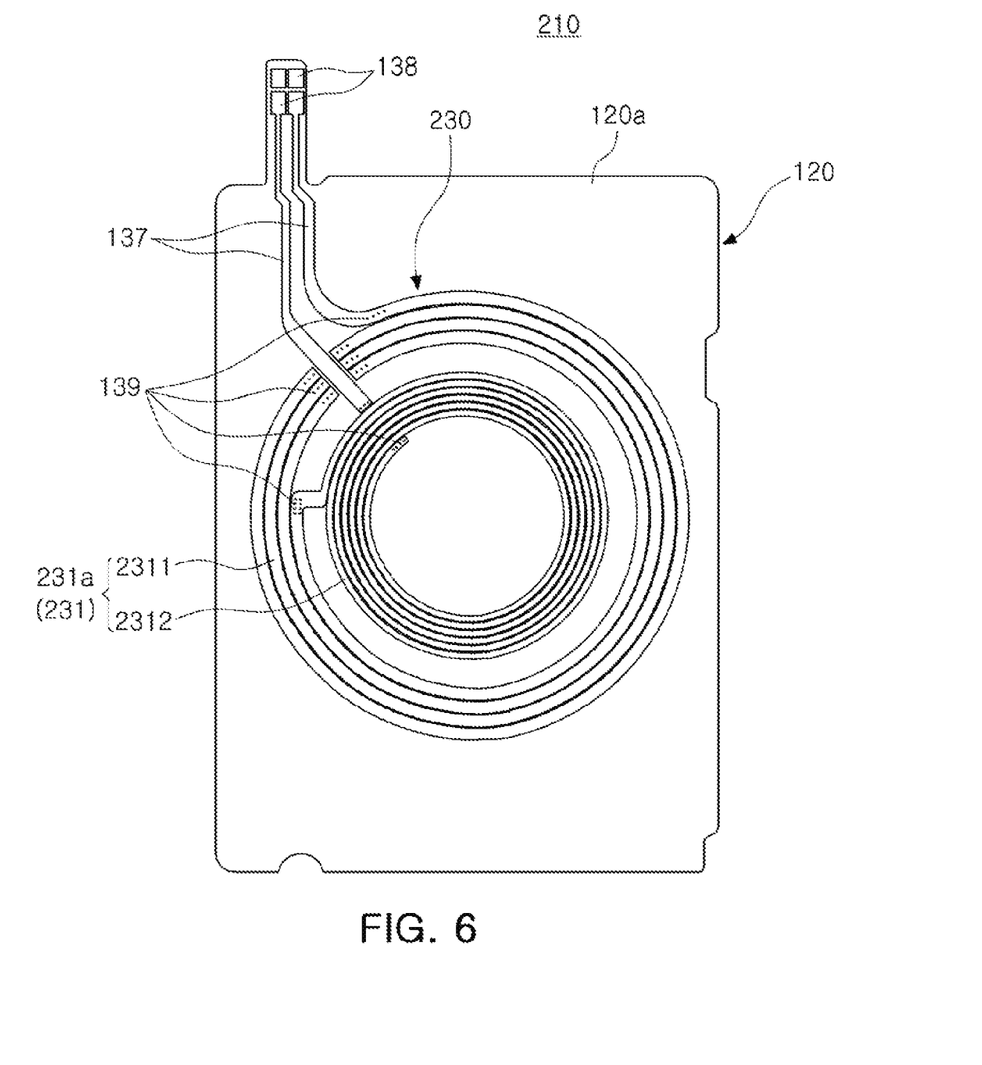
FIG. 6 is a schematic plan view illustrating a coil assembly, according to an embodiment.

Therefore, the first section 1311 may include at least one turn of wiring, and the second section 1312 may include at least one turn of wiring having a width less than a width of the wiring of the first section 1311. Therefore, the spiral wirings 131a and 131b may include two wirings having different widths and connected to each other in series. In addition, the spiral wirings may include at least one turn of a connection wiring 1313 connecting the first section 1311 and the second section 1312 to each other. The connection wiring 1313 may be formed to have a line width gradually decreased toward the second section 1312. However, the coil wiring 130 is not limited to such a configuration, and may be modified in various ways. For example, as illustrated in FIG. 6, a line width of the coil wiring may be changed using a step.

The coil wiring 130 may satisfy the following Equation 1 in relation to a line width of the wiring forming the second section 1312.

$$0.2*P1 \leq P2 < P1 \tag{Equation 1}$$

P1: Line Width of Wiring Forming First Section
P2: Line Width of Wiring Forming Second Section Since line loss in the second section 1312 is greater than that in the first section 1311, when an entire width W2 of the second section 1312 is increased, entire line loss of the spiral wiring may be increased.

As a result of measuring line loss in state in which the second section 1312 consisted of two turns and the first section 1311 consisted of nine turns, it was measured that when the line width P2 of the wiring of the second section 1312 was formed to be 20% or more of the line width P1 of the wiring of the first section 1311, the entire line loss of the spiral wiring was similar to or smaller than the line loss of a spiral wiring according to the related art (for example, a spiral wiring having the same line width).

Therefore, in the embodiment disclosed herein, the line width P2 of the wiring of the second section 1312 may be formed to be smaller than the line width P1 of the wiring of the first section 1311, and may be formed to be 20% or more of the line width P1 of the wiring of the first section 1311. Therefore, a maximum line width of the wiring of the first section 1311 may be four times the line width of the wiring of the second section 1312.

For example, the line width P2 of the wiring of the second section 1312 may be 300 μm or more. However, the line width P2 of the wiring of the second section 1312 is not limited to this example.

In addition, the line width P2 of the wiring of the second section 1312 may increase as the number of turns of the second section 1312 are increased. Therefore, the line width P2 of the wiring of the second section 1312 and the number of turns of the second section 1312 may be in proportion to each other.

For example, when the number of turns of the second section 1312 is one, the line width P2 of the wiring of the second section 1312 may be 20% of the line width P1 of the wiring of the first section 1311. On the other hand, when the number of turns of the second section 1312 is eight and the total number of turns is eleven, the line width P2 of the wiring of the second section 1312 may be 80% or more of the line width P1 of the wiring of the first section 1311.

In addition, in the coil wiring 130, the number of turns of the spiral wiring disposed in the second section 1312 may be 75% or less of the total number of turns of the spiral wiring 131a/131b.

It was measured that in the spiral wiring according to the related art (for example, the spiral wiring having the same line width), an inner wiring and an outer wiring divided on the basis of a point of ¾ in a direction from an inner portion of the spiral wiring toward an outer portion of the spiral wiring have similar line loss.

Therefore, when the number of turns of the second section 1312 is greater than ¾ of the total number of turns of the spiral wiring 131a/131b, the entire line loss of the spiral wirings 131a and 131b may be increased as compared to the case according to the related art described above, due to the line loss generated in the second section 1312. Therefore, in an embodiment, the number of turns of the second section 1312 may be within a range of 75% or less of the total number of turns of the spiral wirings 131a and 131b.

For example, in the embodiment illustrated in FIG. 3, the spiral wirings 131a and 131b may have a total of thirteen turns. Therefore, a range corresponding to 75% or less of the thirteen turns is approximately nine or less turns. Therefore, the second section 1312 may include at most nine turns, and the first turns 1311 may include at least four turns.

According to an embodiment, a line loss increased due to the line width P2 of the wiring of the second section 1312 being small may be compensated for by forming the line width P1 of the wiring of the first section 1311 to be greater than that of the wiring according to the related art.

Sizing of the widths P1 and P2 will be described in more detail. In the coil assembly 110, the line width P2 of the wiring of the second section 1312 is small, and the entire width W2 of the second section 1312 may thus occupy a smaller region as compared to the spiral wiring according to the related art having the same number of turns (for example, the spiral wiring having the same line width). Therefore, when an entire width W0 of the spiral wiring 131a/131b is the same as the entire width of the spiral wiring according to the related art, an entire width W1 of the first section 1311 may be wider in comparison to the spiral wiring according to the related art. Therefore, the wirings of the first section 1311 may be formed to have the line width P1 greater than a line width of the spiral wiring according to the related art.

Due to the configuration as described above, the coil assembly 110 may significantly decrease loss generated in a wireless power charging process as compared to a coil assembly according to the related art in which all of the coil wirings are have the same width.

Generally, in a case of a spiral coil, a higher voltage may be induced in a wiring close to a central portion of the spiral coil than in a wiring of an outer portion of the spiral coil.

Since line loss is in inverse proportion to a voltage, in the related art in which all of the coil wirings have the same width, line loss may be small in the wiring disposed closely to the central portion of the spiral coil, and may be great in the wiring of the outer portions of the spiral coil.

However, in the embodiment disclosed above, the wiring of the second section 1312 disposed closely to the central portion may have the small line width, and the line loss in the second section 1312 may thus be increased as compared to the related art. However, the wiring of the first section 1311 may have the greater line width P1 as compared to the related art, and the line loss in the first section 1311 may thus be decreased as compared to the related art.

The following Table 1 represents measurement results of wireless transmission efficiency of the coil assembly 110 (first coil assembly) according to the embodiment disclosed above and the coil assembly (second coil assembly) according to the related art described above.

TABLE 1

| | Input | | Output | | |
|---|---|---|---|---|---|
| | V(V) | I(A) | V(V) | I(A) | Efficiency (%) |
| First Coil Assembly | 8.41 | 1.44 | 8.83 | 0.998 | 72.77 |
| Second Coil Assembly | 8.38 | 1.465 | 8.82 | 0.999 | 71.77 |

In the comparison above, each of the first and second coil assemblies included eleven turns of spiral wiring, and in the first coil assembly, two turns disposed at the innermost portion among the eleven turns were formed in a second section in which the line width of the wiring was small. In addition, the line width P2 of the wiring of the second section 1312 was 50% of the line width P1 of the wiring of the first section 1311.

Referring to Table 1, it can be observed that when the second section 1312 in which the line width of the wiring was small was disposed at the central portion of the spiral wiring 131 as in the embodiment described above, wireless transmission efficiency was increased.

As described above, the coil assembly 110 may include the second section 1312 in which the line width of the wiring is small to provide higher wireless transmission efficiency as compared to the related art.

In addition, the coil assembly 110 may include the second section 1312 to also significantly decrease an eddy current generated in the coil wiring 130.

Since the coil wiring 130 is disposed in a magnetic field in a form of a conductor plate, the eddy current may be generated on a surface of the coil wiring 130 in the wireless power charging process.

In the spiral wiring 131, a magnetic flux is concentrated on a central region of the spiral wiring 131, and the eddy current may thus be concentrated on the wiring (for example, the wiring of the second section) close to the central region. In addition, generally, the eddy current increase as a size (for example, a width) of the wiring becomes large.

However, in the coil assembly 110, the line width P2 of the wiring of the second section 1312 close to the central region may be smaller than the line width P1 of the wiring of the first section 1311. Therefore, an area of a conductor (for example, the width of the wiring) in the second section 1312 is significantly decreased, and the generation of the eddy current may thus be suppressed. Therefore, loss due to the eddy current may also be significantly decreased.

The disclosure herein is not limited to the abovementioned embodiment, but may be modified in various ways.

Figure 7:
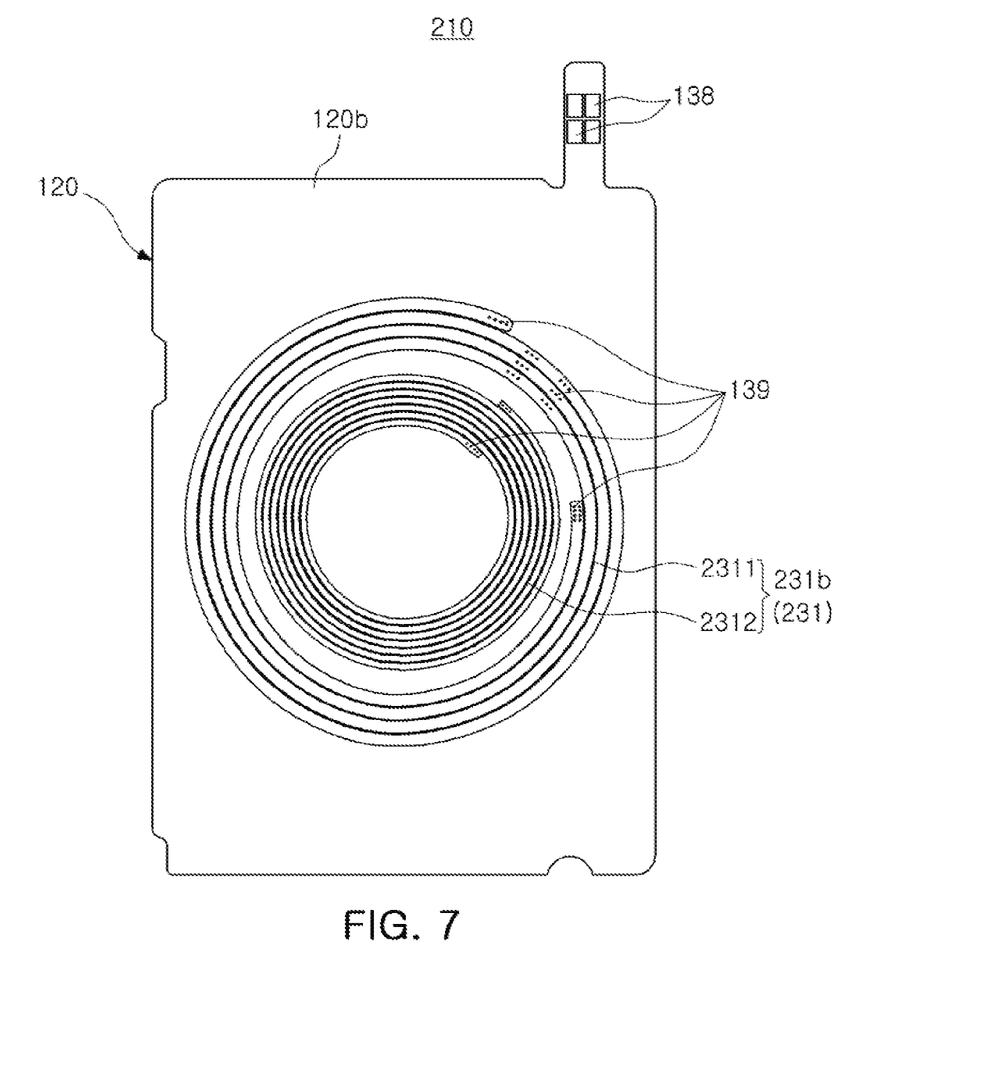
FIG. 7 is a rear view of the coil assembly illustrated in FIG. 6.

FIG. 6 is a schematic plan view illustrating a coil assembly 210, according to an embodiment. FIG. 7 is a rear view of the coil assembly 210.

Referring to FIGS. 6 and 7, in a coil wiring 230 of the coil assembly 210, a second section 2312 of the first spiral wiring 231a formed on the first surface 120a of the substrate 120 and a second section 2312 of the spiral wiring 231b formed on the second surface 120b of the substrate 120 may be connected to each other in series. The first and second spiral wirings 231a and 231b are collectively referred to as spiral wiring 231.

Therefore, the second surface 2312 formed on the first surface 120a may extend from the first section 2311, and the second section 2312 formed on the second surface 120b may be connected to the lead wirings 137 through the interlayer connection conductors 139.

In this case, a number of turns of the second section 2312 may be decreased as compared to the embodiment of FIGS. 2 through 5. In addition, since an entire width of the second section 2312 is decreased, a line width of the wiring of the first section 2311 may be further increased to further decrease line loss.

Figure 8:
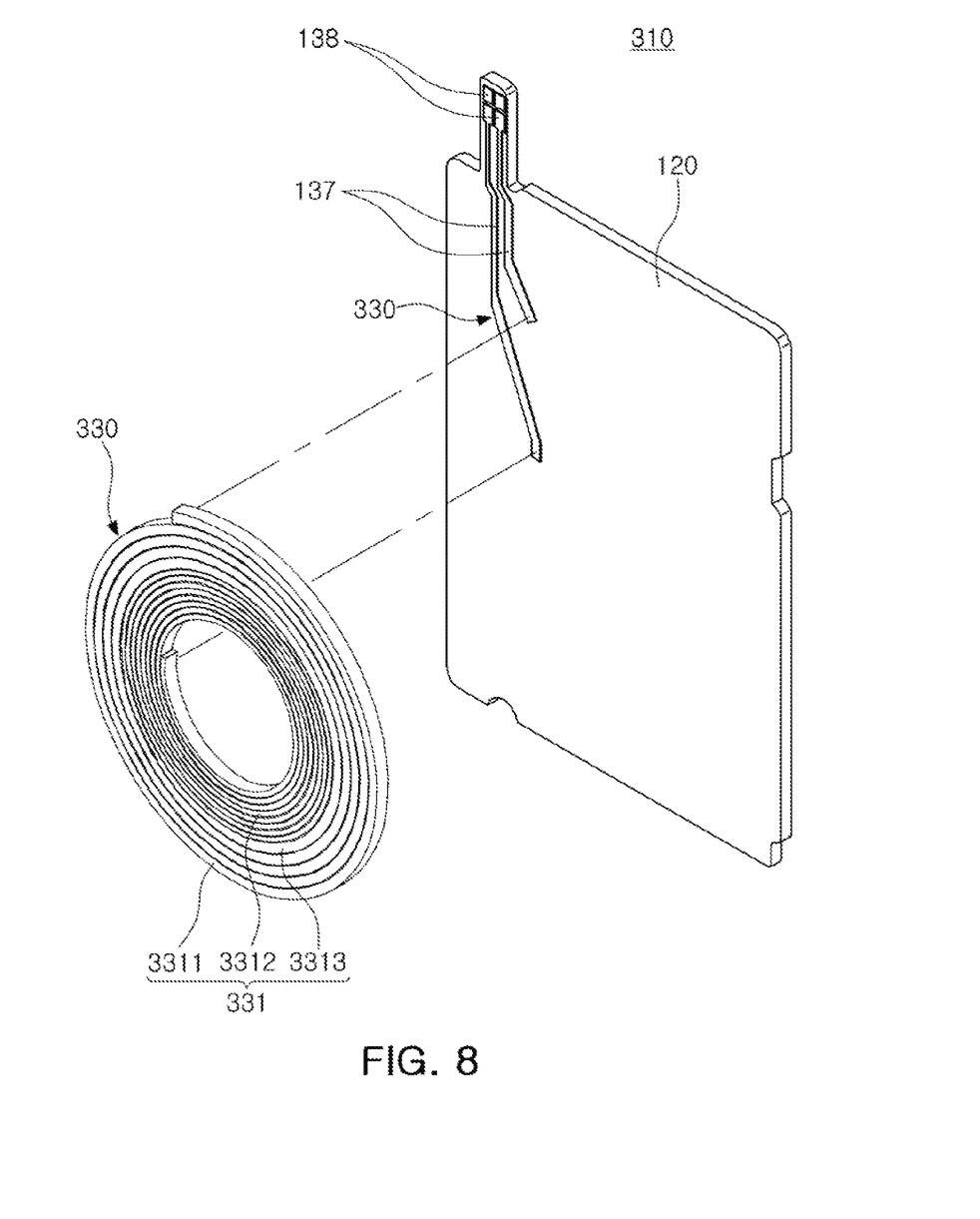
FIG. 8 is a schematic exploded perspective view illustrating a coil assembly, according to an embodiment.

FIG. 8 is a schematic exploded perspective view illustrating a coil assembly 310, according to an embodiment.

Referring to FIG. 8, in a coil wiring 330 of the coil assembly 310, the lead wires 137 and connection pads 138 formed of a thin film metal layer are disposed on the substrate 120. In addition, a press coil formed by pressing a metal plate may be used as the spiral wiring 331. The spiral wiring 331 is not limited to such a construction, and may be modified in various ways. For example, a flat type coil (or an edge wise coil) coated with an insulating coating may be used as the spiral wiring 331 or a general insulated wire may be used as the spiral wiring 331.

As in the embodiment of FIGS. 6 and 7, the spiral wiring 331 may include a first section 3311 and a second section 3312 having different widths. In addition, the first section 3311 and the second 3312 may be continuously formed without being disconnected. In addition, the spiral wiring 331 may include at least one turn of a connection wiring 3313 connecting the first section 3311 and the second section 3312 to each other.

In FIG. 8, an example in which the spiral wiring 331 is disposed on only one surface of the substrate 120 is described, but the spiral wiring 331 may also include first and second spiral wirings disposed on opposite surfaces of the substrate 120, if necessary. In this case, the first and second spiral wirings may be connected to each other in series or in parallel, and interlayer connection conductors connecting the first and second spiral wirings to each other may be included in the substrate 120.

Figure 9:
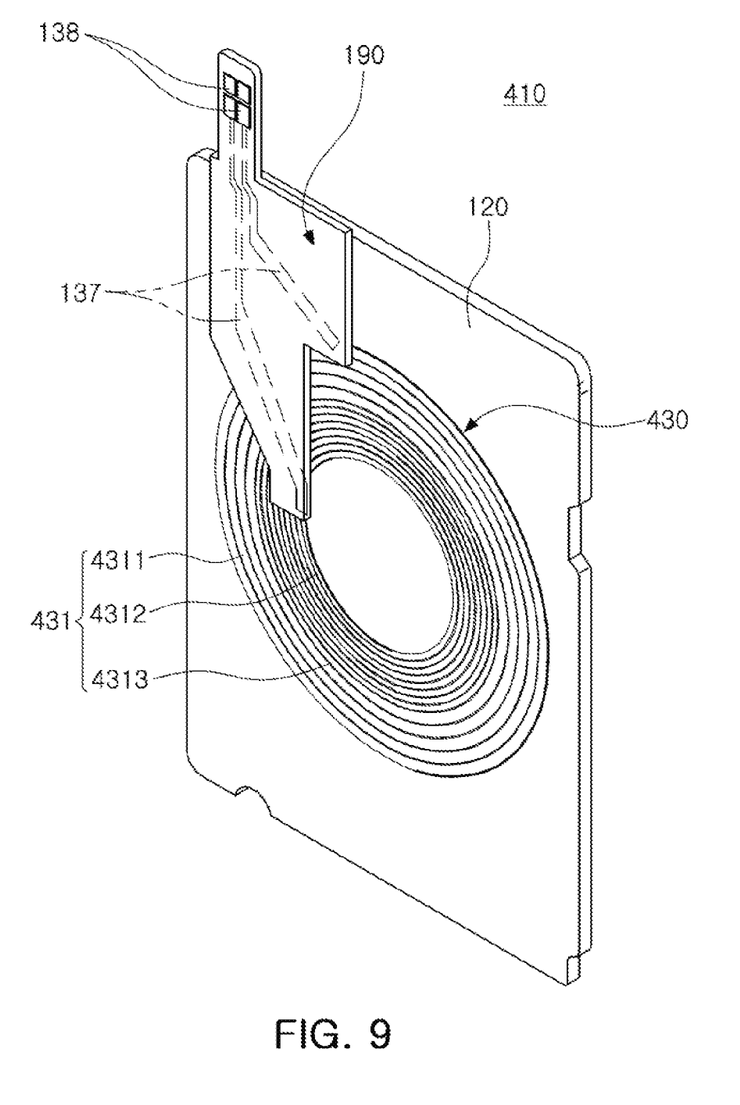
FIG. 9 is a schematic perspective view illustrating a coil assembly, according to an embodiment.

FIG. 9 is a schematic perspective view illustrating a coil assembly 410, according to an embodiment.

Referring to FIG. 9, in a coil wiring 430 of the coil assembly 410, a spiral wiring 431 formed of a thin film metal layer is disposed on the substrate 120.

As in the abovementioned exemplary embodiments, the spiral wiring 431 may include a first section 4311 and a second section 4312 having different widths. In addition, the first section 4311 and the second 4312 may be continuously formed without being disconnected.

In addition, the coil assembly 410 may include a connection substrate 190.

The connection substrate 190 may be provided in order to electrically externally connect the spiral wiring 431. To this end, the connection substrate 190 may include a plurality of wirings and the connection pads 138. Here, the plurality of wirings may include the lead wirings 137.

A flexible printed circuit board (FPCB) may be used as the connection substrate 190. However, the connection substrate 190 is not limited to an FPCB.

In the embodiment of FIG. 9, an example in which the spiral wiring 431 is formed on only one surface of the substrate 120 is described by way of example, but the spiral wiring 431 may also include first and second spiral wirings formed on opposite surfaces of the substrate 120, if necessary. In this case, the first and second spiral wirings may be connected to each other in series or in parallel, and interlayer connection conductors connecting the first and second spiral wirings to each other may be included in the substrate 120.

Figure 10:
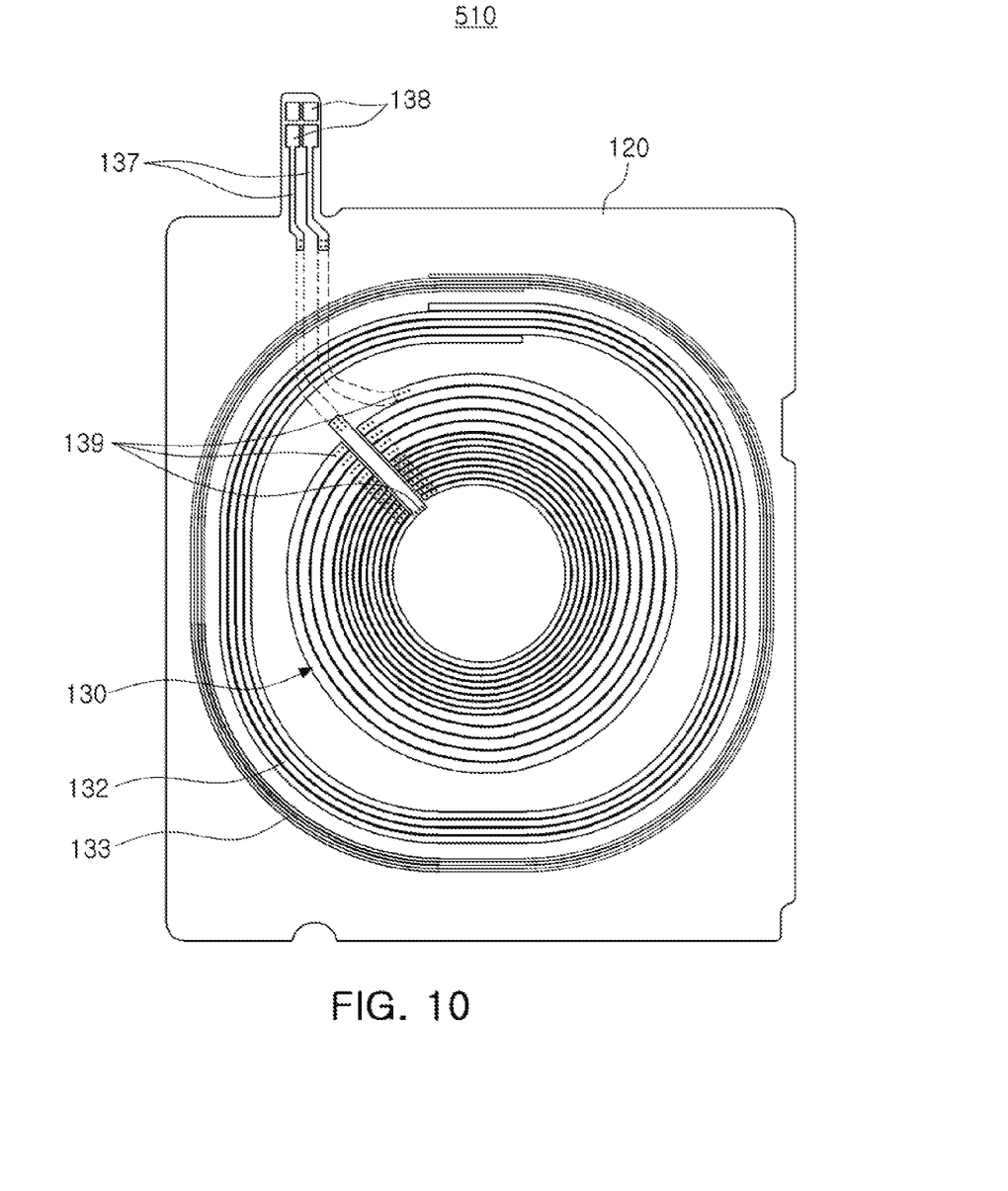
FIG. 10 is a schematic perspective view illustrating a coil assembly, according to an embodiment.

FIG. 10 is a schematic perspective view illustrating a coil assembly 510, according to an embodiment.

Referring to FIG. 10, the coil assembly 510 includes a plurality of spiral wirings 130, 132 and 133.

The coil assembly 510 includes a second coil wiring 132 and a second coil wiring 133 disposed outside of the first coil wiring 130. The first coil wiring 130 may have the same structure described above with reference to FIG. 3. However, the coil wirings 230, 330, and 430 according to the other embodiments described above may also be used.

Each of the second coil wiring 132 and the third coil wiring 133 is illustrated such that the entire section thereof has the same line width, but each of the second coil wiring 132 and the third coil wiring 133 may also include first and second sections having different widths, as in the first coil wiring 130, if necessary. In addition, both ends of the second wiring coil 132 and the third wiring coils 133 also need to be connected to the connection pads 138, which is omitted in FIG. 10 for convenience of explanation.

The first coil wiring 130 according may be used to transmit and receive power for wireless charging. In addition, the second coil wiring 132 and the third coil wiring 133 may be used as antennas. For example, each of the second and third coil wirings 132 and 133 may perform at least one of a radio frequency identification (RFID) function, a near field communications (NFC) function, and a magnetic secure transmission (MST) function.

FIG. 10 illustrates an example in which the first coil wiring 130 is disposed in central regions of the second coil wiring 132 and the third coil wiring 133 is described by way of example, but the coil wirings 130, 132, and 133 are not limited to such a configuration. That is, the second coil wiring 132 or the third coil wiring 133 may also be disposed at the center of the first coil wiring 130. In addition, the coil assembly 510 may also be configured to include only any one of the second coil wiring 132 and the third coil wiring 133.

As set forth above, a coil assembly according to the disclosure herein may provide higher transmission efficiency as compared to the related art by disposing the wiring having a small line width at the center of the spiral wring.

In addition, in the embodiments described herein, an example in which the connection pads are disposed outside of the coil wiring is described, but the connection pads may also be disposed inside the coil wirings, if necessary or desired.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil assembly, comprising:
   a substrate; and
   a coil wiring coupled to the substrate and comprising a spiral wiring and a lead wiring,
   wherein the spiral wiring comprises a first section forming an outer portion of the spiral wiring and a second section, disposed inside the first section, and having a line width narrower than a line width of the first section.

2. The coil assembly of claim 1, wherein the spiral wiring satisfies $0.2*P1 \leq P2 < P1$, wherein P1 is a line width of a wiring part forming the first section and P2 is a line width of a wiring part forming the second section.

3. The coil assembly of claim 1, wherein a number of turns of the spiral wiring disposed in the second section is 75% or less of a total number of turns of the spiral wiring.

4. The coil assembly of claim 1, wherein spiral wiring parts constituting the first section are disposed on opposite surfaces of the substrate, respectively, and end portions of the spiral wiring parts are connected to each other.

5. The coil assembly of claim 1, wherein spiral wiring parts constituting the second section are disposed on opposite surfaces of the substrate, respectively, and end portions of the spiral wiring parts are connected to each other.

6. The coil assembly of claim 1, wherein spiral wiring parts constituting the second section are disposed on opposite surfaces of the substrate, respectively, and are connected to each other in series.

7. The coil assembly of claim 1, wherein the lead wire traverses the spiral wiring in a diameter direction of the spiral wiring.

8. The coil assembly of claim 7, wherein the lead wire is disposed on a first surface of the substrate, and is connected to a wiring of the second section disposed on a second surface of the substrate through an interlayer connection conductor formed in the substrate.

9. The coil assembly of claim 1, wherein the spiral wiring comprises any one of a press coil formed by pressing a metal plate in a coil shape, a flat type wire, and an insulated wire.

10. The coil assembly of claim 1, wherein the lead wire is disposed outside of the second section.

11. The coil assembly of claim 1, further comprising a connection substrate coupled to one surface of the substrate and having the lead wired formed thereon.

12. The coil assembly of claim 1, wherein
   the spiral wiring comprises at least one turn of a connection wiring connecting the first section and the second section to each other, and
   the connection wiring has a line width gradually decreasing toward the second section.

13. The coil assembly of claim 1, wherein the coil wiring is configured to transmit and receive power for wireless charging.

14. The coil assembly of claim 13, further comprising a second coil wiring and a third coil wiring disposed in a vicinity of the spiral wiring,
   wherein each of the second and third coil wirings are configured to perform any one of a radio frequency identification (RFID) function, a near field communications (NFC) function, and a magnetic secure transmission (MST) function.

15. A coil assembly, comprising:
   a connection substrate comprising a lead wiring having a first end connected to a connection pad; and
   a coil wiring comprising a first section extending from a second end of the lead wiring, and a second section disposed inside the first section, extending spirally from the first section, and having a line width narrower than a line width of the first section.

16. The coil assembly of claim 15, wherein a line width of a wiring part forming the second section is 20% or more of a line width of a wiring part forming the first section.

17. The coil assembly of claim 16, wherein a number of turns of the coil wiring disposed in the second section is 75% or less of a total number of turns of the coil wiring disposed in the first section.

18. The coil assembly of claim 15, further comprising another coil wiring disposed outside of the coil wiring,
wherein the coil wiring is configured to transmit or receive power for wireless charging, and the other coil wiring is configured to operate as an antenna.

* * * * *